Figure 1:
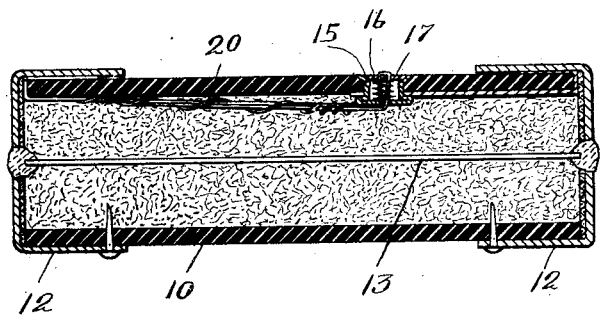

F. N. CONANT.
INCLOSED ELECTRIC FUSE.
APPLICATION FILED JAN. 2, 1912.

1,081,214.

Patented Dec. 9, 1913.

Witnesses:
H. B. Davis.
H. McDonald

Inventor:
Franklin N. Conant
by Meyer Harriman
Attys.

UNITED STATES PATENT OFFICE.

FRANKLIN N. CONANT, OF NEWBURYPORT, MASSACHUSETTS, ASSIGNOR TO CHASE-SHAWMUT COMPANY, OF BOSTON, MASSACHUSETTS, A CORPORATION OF MAINE.

INCLOSED ELECTRIC FUSE.

1,081,214.       Specification of Letters Patent.       Patented Dec. 9, 1913.

Application filed January 2, 1912. Serial No. 668,834.

*To all whom it may concern:*

Be it known that I, FRANKLIN N. CONANT, a citizen of the United States, residing at Newburyport, in the county of Essex and State of Massachusetts, have invented an Improvement in Inclosed Electric Fuses, of which the following is a specification.

This invention relates to inclosed electric-fuses having a spring operated fuse-indicator, and has for its object the production of means to control the operation of the spring-indicator, which involves an indicator controlling element forming a part of a shunt which is adapted to be destroyed by an abnormal current passing through the shunt, and when destroyed to permit the indicator to operate; and also the production of an improved form of spring indicator.

In the present embodiment of my invention the indicator controlling means involves an indicator controlling-wire, which is attached at one end to one of the metallic end-pieces of the fuse-case, and at the other end to the indicator, which latter is arranged in an aperture in the side of the fuse-case, and means within the case to electrically connect said indicator controlling-wire with the other metallic end-piece of the fuse-case, thereby to form a concealed shunt. The indicator controlling-wire is preferably of higher resistance material than the means to electrically connect said controlling-wire with the other end-piece of the fuse-case, said wire being preferably German silver and said connecting-means being a strip of copper, so that the controlling-wire will certainly fuse and the copper strip will not. The spring-indicator comprises essentially a case, an actuating-spring and an indicating-plug, said case fitting an aperture in the side of the fuse-case and containing both the actuating-spring and indicating-plug, and said indicating-plug adapted to be held by the indicator controlling-wire against the tension of the actuating-spring, so that when released it will be free to be expelled by the actuating-spring.

The indicator controlling-wire is made as a loop, and the end of the loop passes through two small holes in the indicating-plug, thereby to connect the indicating-plug therewith. The indicating-plug is made larger in diamter than the internal diameter of the cylinder case, or at least the body portion thereof, and the outer end of the case is flared outwardly to form a seat for the engagement therewith of the indicating-plug, said plug being held in engagement with said seat and against the tension of the actuating-spring by the indicator controlling-wire.

In the present embodiment of my invention the inner end of the indicator controlling-wire passes through a small hole in the inner end of the indicator-case, and is connected with the indicating-plug, and the outer end of the indicator controlling-wire is attached to one of the metallic end-pieces of the fuse-case, and the strip of copper which electrically connects said indicator controlling-wire with the other metallic end-piece of the fuse-case, is formed with a perforation at its inner end to receive the indicator-case and thereby to form an electrical engagement therewith.

Figure 2:
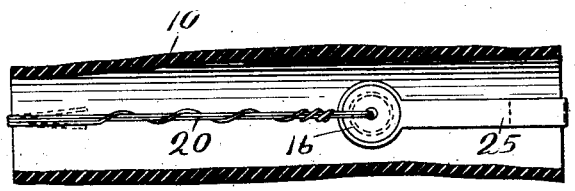
Figure 3:
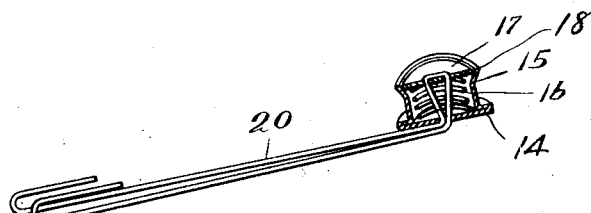

Figure 1 is a central longitudinal section of an inclosed electric-fuse having an indicator, and means embodying my invention for controlling the operation of the indicator. Fig. 2 is a detail plan view of the controlling-means for the indicator shown in Fig. 1. Fig. 3 is a modified form of controlling-means, in connection with the spring indicator of Fig. 1, wherein the indicator controlling-wire is made alike throughout its length.

10 represents the fuse-case; 12, 12 metallic caps or pieces arranged on its ends; 13 a fuse-strip arranged within the case and extended lengthwise thereof and connected at its ends to the end-pieces 12, 12.

The fuse so far described is or may be of any well known or suitable construction, and its case may be filled with any usual or suitable substance.

The spring indicator here shown for the purpose of illustrating the invention embodies novel features. It comprises a cylindrical hollow metallic case 15 having a flanged head 14 at its inner end and having its outer end flared outwardly, as at 18, to form a seat, an actuating-spring 16 adapted to be contained in the case but not usually connected therewith, and a plug 17 also adapted to be contained in the case but not usually connected with the actuating-spring. Said plug 17 is made as a circular disk, of a diameter larger than the diameter of the opening in the case, thus adapting it to engage the seat 18. Said plug 17 is adapted to be held normally in engagement with said seat and against the compressed actuating-spring 16, so that when released it will be expelled by the spring. Said plug is usually colored on the outside and serves as the indicating-plug. Said indicator is arranged in an aperture in the side of the case, which may be located at any desired part thereof, and the aperture is made of suitable size to receive the indicator-case with a snug fit, so as to prevent the escape of the gases around the case. It will be noted that the indicator-case and actuating-spring and indicating-plug are entirely separate from each other, so that when the indicating-plug is released it will be expelled and the actuating-spring will likewise fly away from the case.

20 represents the indicator controlling-wire, which is made of high resistance fusible material, such as German silver. It is arranged within and extended lengthwise the fuse case. Its outer end is attached to one of the metallic end-pieces 12, and its inner end is passed through a small hole in the end of the indicator-case, and thence through the convolutions of the actuating-spring, and is connected to the indicating-plug. In Fig. 1 it is composed of three strands, two of which extend the full length, so that the wire may be passed through two holes in the indicating-plug while the third strand terminates near the indicator, being coiled around the other strand, thereby to form a weakened portion adjacent the indicator. In Fig. 3, said indicator controlling-wire is composed of but two strands, arranged to form a loop, the weakened portion being omitted.

25 represents a strip of copper or equivalent low resistance material. Its outer end is connected to one of the end-pieces of the fuse-case and its inner end is perforated to receive the indicator-case 15, thereby to obtain electrical connection therewith. Said strip serves to electrically connect the indicator controlling-wire with the other end-piece of the fuse-case, thereby to form a concealed shunt. Ordinarily when the fuse blows said strip 25 will remain intact as the high-resistance indicator controlling-wire is more easily fusible.

I claim:—

1. In an inclosed electric-fuse, a fuse-case having metallic end-pieces and having an aperture in its side, a fuse-strip arranged in the case and electrically connected with the end-pieces, a spring-indicator arranged in said aperture comprising a case, an actuating spring and plug engaging said spring, a high resistance indicator controlling-wire arranged in the case and connected at one end with one of the end-pieces, its other end passing through a hole in the indicator-case and through the actuating-spring and attached to the plug, and a metallic conducting-strip arranged within the case and extended lengthwise thereof, having a perforation at its inner end to receive the indicating-case and form electrical engagement therewith, its outer end being attached to the other end-piece of the fuse-case, substantially as described.

2. An inclosed filled fuse of the cartridge type having a non-conducting casing, metallic end caps and a main fuse-strip extending from one to the other end cap through the filling, said fuse case having a circular hole within which is contained a metallic indicator chamber rearwardly flanged so as to resist expulsion from the case, said indicator chamber containing a coiled spring held under tension by an indicating disk which is held normally at the level of the exterior of the case by the indicator controlling device consisting of a German silver wire attached to said disk, extending through the bottom of the indicator chamber and thence along the inner wall of the casing to one of the end caps of the fuse, said indicator controlling wire being electrically connected with a strip of low resistance metal extending from the indicator chamber to the other metallic end cap of the fuse and electrically connected therewith, thus forming an interior shunt so that the indicator controlling device will be fused and the indicating disk released when the main fuse wire breaks, substantially as described.

3. An inclosed electric fuse having a spring-indicator consisting of a case, the outer end of which is flared outwardly to form a seat, a plug adapted to engage said seat, an actuating-spring contained in the case and adapted to be held compressed by said plug when the latter is in engagement with its seat, and an indicator controlling-wire connected to said plug to hold it in engagement with its seat with the spring compressed, substantially as described.

4. An inclosed electric-fuse having a spring-indicator consisting of a case adapted to be arranged in an aperture in the side of the fuse-case having a flanged head at its inner end and having its outer end flared outwardly to form a seat, a plug to engage said seat, an actuating-spring contained in the case and held compressed by said plug when the latter is in engagement with its seat, an indicator controlling-wire made as a loop, the end of which passes through a hole in the head of the indicator case and through the actuating-spring and through two holes in the indicator-plug, said indicator controlling-wire holding the plug in engagement with its seat with the spring compressed, substantially as described.

In testimony whereof, I have signed my name to this specification, in the presence of two subscribing witnesses.

FRANKLIN N. CONANT.

Witnesses:
B. J. NOYES,
H. B. DAVIS.